United States Patent [19]

Arinell

[11] Patent Number: 5,694,451

[45] Date of Patent: Dec. 2, 1997

[54] METHOD AND AN ARRANGEMENT FOR PERFORMANCE MONITORING IN A TELECOMMUNICATIONS NETWORK

[75] Inventor: Frederik Arinell, Stockholm, Sweden

[73] Assignee: Televerket, Farsta, Sweden

[21] Appl. No.: 466,663

[22] Filed: Jun. 6, 1995

Related U.S. Application Data

[63] Continuation of Ser. No. 982,582, Nov. 27, 1992, abandoned.

[30] Foreign Application Priority Data

Nov. 27, 1991 [SE] Sweden ................... 9103501

[51] Int. Cl.⁶ .................. H04M 3/22; H04M 11/00; H04M 15/00; H04B 17/00
[52] U.S. Cl. .................. 379/34; 379/59; 379/113; 379/133; 379/140; 455/67.1
[58] Field of Search .................. 379/34, 32, 58–61, 379/111–113, 133–134, 139–140, 201, 144, 209; 455/54.1, 67.1

[56] References Cited

U.S. PATENT DOCUMENTS

| 4,406,925 | 9/1983 | Jordan | 379/140 |
|---|---|---|---|
| 4,484,030 | 11/1984 | Gavrilovich | 379/34 |
| 4,656,657 | 4/1987 | Hunsicker | 379/140 |
| 4,788,718 | 11/1988 | McNabb et al. | 379/134 |
| 4,922,515 | 5/1990 | Simpson, Jr. | 379/34 |
| 4,924,488 | 5/1990 | Kosich | 379/34 |
| 4,951,308 | 8/1990 | Bishop et al. | 379/144 |
| 5,023,868 | 6/1991 | Davidson et al. | 379/112 |
| 5,023,900 | 6/1991 | Tayloe et al. | 379/32 |
| 5,060,258 | 10/1991 | Turner | 379/113 |
| 5,109,401 | 4/1992 | Hattori et al. | 379/113 |
| 5,142,570 | 8/1992 | Chaudhary | 379/113 |
| 5,175,867 | 12/1992 | Wejke | 455/67.1 |
| 5,230,017 | 7/1993 | Alexander | 379/113 |
| 5,272,747 | 12/1993 | Meads | 379/59 |
| 5,323,446 | 6/1994 | Kojima | 455/54.1 |
| 5,335,356 | 8/1994 | Andersson | 455/67.1 |

FOREIGN PATENT DOCUMENTS

| 0431 956 | 6/1991 | European Pat. Off. . |
|---|---|---|
| 2227143 | 7/1990 | United Kingdom . |
| WO 91/03111 | 3/1991 | WIPO . |

OTHER PUBLICATIONS

28th IEEE Vehiculartechnology Conference, pp. 66–72, Mar. 22, 1978, D.L. Huff, et al., "The Chicago Developmental Cellular System".

British Telecommunications Engineering, vol. 8, No. 1, pp. 2–5, Apr. 1989, M.J. Jupp, "Monolog–A Single–Like Call Logging Device".

Teletraffic Science For New Cost–Effective Systems, Networks And Services, ITC–12, pp. 507–513, Jun. 1988, O.A. Avellaneda, et al., "Traffic Grade of Service Standards for Cellular Mobile Radio Systems—Issues and Approaches".

Southwestern Bell Cellular Service System Description 1985.

Primary Examiner—Curtis Kuntz
Assistant Examiner—Vijay Shankar
Attorney, Agent, or Firm—Oblon, Spivak, McClelland, Maier & Neustadt, P.C.

[57] ABSTRACT

The invention relates to a method and an arrangement for terminal-oriented performance monitoring in a telecommunications network having a public side and a mobile subscriber side with terminals. Information with respect to network performance is collected by the subscriber terminals or in connection with the subscriber terminals and transferred to the public side. The information includes the grade of service, information on error conditions and information on the quality of the transmission channel in the network and non-connection information. With the aid of the invention the network operator is provided with a picture of the performance from the point of view of the customer and he can thus operate the network more effectively at the same time as the performance experienced by the customer is kept under control.

7 Claims, 1 Drawing Sheet

METHOD AND AN ARRANGEMENT FOR PERFORMANCE MONITORING IN A TELECOMMUNICATIONS NETWORK

This application is a continuation of application Ser. No. 07/982,582, filed on Nov. 27, 1992, now abandoned.

BACKGROUND OF THE INVENTION

The invention relates to a method and an arrangement for performance monitoring, in a telecommunications network and, in particular, a mobile telephone network.

A telecommunications network has one side thereof which consists of a public or landline network and the side thereof which consists of a subscribers' network. The subscribers' network includes terminals which, in the case of a mobile telephone network, can be mobile terminals.

With a mobile telephone network, the subscriber's perception of the performance of the network can provide important information for the network operator.

Known methods for collecting information relating to network performance in a mobile telephone network can be divided into two major groups.

With the first of these groups, information is collected on the traffic handled, the number of successful or unsuccessful calls established, transferred and disconnected, and so on, on the public or landline side of the network. In known performance monitoring system architectures, information can be stored, in principle, at a very detailed level, for example, radio channels, subscribers, terminals, connections and so forth. However, such systems presuppose that it is possible to establish a connection with and identify the terminal concerned.

In the second of these groups, test traffic is used on the subscribers' i.e. mobile, side of the network. Network operators have recently established various performance monitoring systems for obtaining information concerning network operation as seen from the mobile side of the network. In such systems, geographical and system-related information can be collected for subsequent compilation at a central location. The collected items of information are obtained as a result of the use of test traffic, for example, in the form of a large number of connections, calls, transfers and disconnections made along a test link. This type of test traffic also provides the network operator with information concerning how the mobile telephone network looks from the mobile side, with the important reservation that it is test traffic and not "real" traffic that is monitored and thereby observed during the test period. With this performance monitoring arrangement, it is likely that the reliability of the statistics obtained through use of the test traffic will be of doubtful validity because the test traffic to which the statistics relate will be disturbed by other test traffic or the marginal test traffic will result in the mobile telephone network demonstrating problems which would not otherwise have occurred.

It is an object of the present invention to overcome the foregoing problems by using a terminal-orientated performance monitoring method and arrangement wherein information related to call and network performance of a telecommunications system is stored in, or in association with, the subscribers' terminals which are connected to the system. The provision of storage can consequently be included in the system specification. The information which can then be obtained is not accessible by any of the above-mentioned known methods for monitoring the network performance.

SUMMARY OF THE INVENTION

The invention provides a method for performance monitoring in a telecommunications network having a first side which comprises a public network and having a second side which comprises a subscribers' network with subscriber terminals, the method including the steps of collecting information relating to the performance of the telecommunications network on the subscribers' side of the network and transferring the collected information to the public side of the network.

The information that is collected relates, inter alia, to grade of service, call switching and transmission channel quality.

The transfer of information can be effected by means of a protocol established between the two sides of the network or by deduced protocols/sequences i.e. as part of call set-up, call transfer, or call disconnect.

The invention also provides an arrangement for performance monitoring in a telecommunications network having a first side comprising a public network and a second side comprising a subscribers' network with subscriber terminals, wherein the subscriber terminals include, or are associated with, means for collecting information on network performance and for transferring the collected information to the public side of the network.

The foregoing and other features according to the present invention will be better understood from the following description of preferred embodiments of the invention.

DESCRIPTION OF THE PREFERRED EMBODIMENTS OF THE INVENTION

Figure 1:
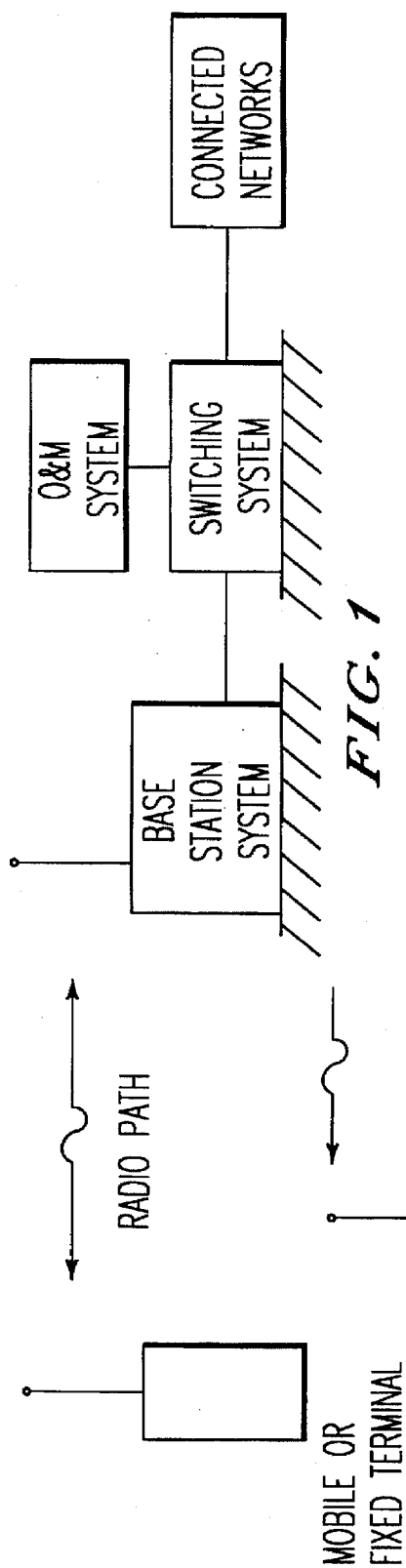
FIG. 1 is a schematic of a conventional mobile telephone network.

As stated above, a telecommunications network consists of a public or landline side and a subscribers' side. The public or landline side consists of stations and connection channels and is controlled by the network operator. The subscribers' side consists of subscriber terminals, for example, data terminals and telephones.

In order to facilitate efficient operation of the network by the network operator and to minimize network problems, it is important for the operator to be able to obtain detailed information concerning the performance of the network, as experienced by the customer. This information will enable the operator to rectify any errors and/or other problems that may arise, to expand the network as and when required in a suitable/preferred way, etc.

In a mobile telephone network, the following information, for example, can be used by the network operator:

(a) information on the grade of service, that is to say the amount of time a subscriber's terminal was unable to communicate with the public or landline side of the network during the period of time the terminal was activated but outside the coverage area of the terminal, i.e. without being able to communicate with the base station;

(b) detailed information on all error conditions associated with call switching i.e. call set-up, call communication and call disconnection coupled with information on traffic area, base station identity, position, etc. This information is not accessible by means of error monitoring functions in base stations and exchanges when it is not possible to identify the terminal concerned; and (c) information on the quality of the transmission channel, for example, soft information from an error-correcting decoder.

The subscriber terminals according to the present invention comprise sensing, elements which are adapted to sense selected activities of the terminals, for example, how long the terminal is activated, which switching actions are carried out and how much work is being carried out by the error-correcting decoder. The information relating, to the operation of the sensing elements is stored in suitable registers. Thus, for the collection of the information referred to at (a) above relating to grade of service, the sensing elements will need to include a time-controlled unit and a memory unit.

The stored information is suitably transferred from the subscribers' side of the network to the public side of the network by means of the protocol established between the two sides of the network or by deduced protocols/sequences, for example, in connection with call set-up, call transfer, or call disconnecting or by developing general protocols/sequences.

The method and arrangement according to the present invention provides the network operator with many advantages compared with known performance monitoring technology in that the network operator is provided with customer-orientated information concerning the performance of a telecommunications network and is thereby able to effect more efficient operation of the network and at the same time ensure that the network performance, as experienced by the customer, is kept under control. Thus, in comparison to known systems, the operator obtains a significantly more representative basis for analysis of the system performance, as experienced by the customer. Furthermore, by compiling information on activated terminals and in respect of areas where the operator lacks cover, a valuable information data base can be established for planning, network expansion. If individual subscribers are experiencing an unusually large number of problems, then such subscriber or the terminal owner will be able to obtain from the network operator information concerning such problems and can also obtain help to correct the problems. Known systems provide abundant examples of poor or gradually deteriorated antenna installations, etc., which, in turn, can entail problems even for other subscribers.

The invention is transferred between the subscriber's side and the public side of the network as follows, with reference to FIG. 1. The information is collected by the mobile terminal or by a device connected to it. The information is transferred over the radio path, through the base station system, further through the switching system and to the operations and maintenance (O&M) system. The transfer is initiated either automatically by the mobile terminal or by command from the O&M system.

Figure 2:
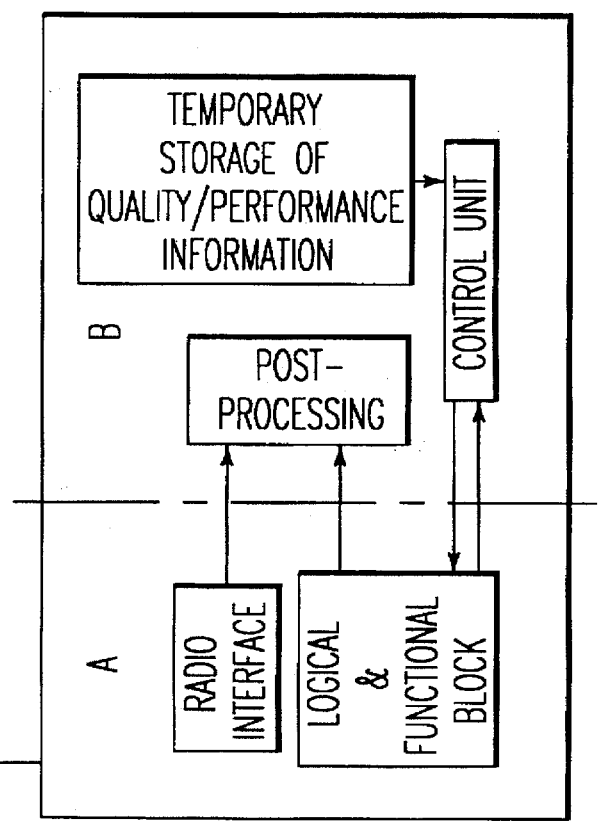
FIG. 2 is block diagram of a mobile or fixed terminal according to the invention.

In FIG. 2A and B together represent the full terminal with performance monitoring. A is a conventional terminal that can work alone as a terminal in the system. In a terminal according to the invention B is integrated with or attached to A. The radio interface transmits continuous information and the logical and functional block transmits event information to the monitoring unit.

Whilst the preferred embodiments of the invention, as outlined above, have been directed towards mobile telephone networks, it wi 'll be directly evident to persons skilled in the art that the present invention can be generalized in many ways so as to make the invention suitable for application to a network for landline telecommunication or data communication, that is to say everything, from the telephones in the home to satellites and personal computers in the data network.

What is claimed as new and desired to be secured by letters patent of the United States is:

1. A method for performance monitoring in a mobile telecommunications network having a first side which comprises a public network and having a second side which comprises a subscribers' network with mobile subscriber terminals, the method including the steps of collecting information relating to the performance of the telecommunications network on the mobile subscribers' network and in the mobile portion thereof, including at least non-connection statistics and transferring over a radio path the collected information to the public network upon connection of mobile subscribers' terminal to said public network wherein the collected information includes information relating to the grade of service provided by the telecommunication network and wherein the grade of service information includes information relating to the amount of time a subscriber terminal was unable to communicate with the public network during the period of time the said terminal was activated but outside the coverage area of the terminal.

2. A method as claimed in claim 1, wherein the information relating to network performance is collected by circuits that are internal to said subscriber terminals.

3. A method as claimed in claim 1, wherein the collected information includes information relating to all error conditions associated with call switching.

4. A method as claimed in claim 1, wherein the collected information includes information relating to the quality of the transmission channel.

5. A method for performance monitoring in a mobile telecommunications network having a first side which comprises a public network and having a second side which comprises a subscribers' network with mobile subscriber terminals, the method including the steps of collecting information relating to the performance of the telecommunications network on the mobile subscribers' network and in the mobile portion thereof, including at least non-connection statistics and transferring over a radio path the collected information to the public network upon connection of mobile subscribers' terminal to said public network, wherein the transfer of the collected information is facilitated by a protocol established between the subscriber terminals and the public and wherein the transfer of the collected information is effected as part of call set-up, call transfer, or call disconnection.

6. A method for performance monitoring in a mobile telephone network having a first side which comprises a public network and having a second side which comprises a subscribers' network with mobile subscriber terminals, the method comprising the steps of:
collecting information relating to the performance of the mobile telephone network on the subscribers' network and in the mobile portion thereof including at least non-connection statistics and transferring over a radio path the collected information to the public network in accordance with a protocol established between the subscriber terminals and the public network upon a connection of a mobile terminal wherein the transfer of the collected information is effected as part of call set-up, call transfer or call disconnection.

7. A method as claimed in claim 6, wherein the collected information relates to grade of service, call switching and transmission channel quality.

* * * * *

UNITED STATES PATENT AND TRADEMARK OFFICE
CERTIFICATE OF CORRECTION

PATENT NO. : 5,694,451
DATED : December 2, 1997
INVENTOR(S) : Fredrik ARINELL

It is certified that error appears in the above-identified patent and that said Letters Patent is hereby corrected as shown below:

On the title page, Item [75], the inventor should read:

-- Fredrik Arinell, Stockholm, Sweden --

Signed and Sealed this

Third Day of February, 1998

Attest:

BRUCE LEHMAN

*Attesting Officer*  *Commissioner of Patents and Trademarks*